United States Patent
Kim et al.

(10) Patent No.: US 9,563,804 B2
(45) Date of Patent: Feb. 7, 2017

(54) DISPLAY DEVICE AND METHOD FOR CONTROLLING THE SAME

(71) Applicant: LG ELECTRONICS INC., Seoul (KR)

(72) Inventors: Jihwan Kim, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/470,302

(22) Filed: Aug. 27, 2014

(65) Prior Publication Data

US 2016/0029014 A1    Jan. 28, 2016

(30) Foreign Application Priority Data

Jul. 22, 2014  (KR) .................. 10-2014-0092476

(51) Int. Cl.
 *H04N 13/04* (2006.01)
 *G06K 9/00* (2006.01)
 *G06F 3/048* (2013.01)

(52) U.S. Cl.
 CPC ........... *G06K 9/00335* (2013.01); *G06F 3/048* (2013.01); *H04N 2013/0461* (2013.01)

(58) Field of Classification Search
 None
 See application file for complete search history.

(56) References Cited

U.S. PATENT DOCUMENTS

| 8,161,403 | B2 | 4/2012 | Lyle et al. | |
|---|---|---|---|---|
| 8,451,216 | B2 * | 5/2013 | Sakata | G06F 3/017 345/156 |
| 2008/0100531 | A1 | 5/2008 | Yoshinaga et al. | |
| 2008/0192059 | A1 * | 8/2008 | Kennedy | G06F 3/0488 345/537 |
| 2009/0322695 | A1 * | 12/2009 | Cho | G06F 3/0416 345/173 |
| 2011/0231795 | A1 | 9/2011 | Cheon et al. | |
| 2012/0096390 | A1 | 4/2012 | Kwahk et al. | |
| 2012/0174020 | A1 | 7/2012 | Bell et al. | |
| 2012/0266093 | A1 * | 10/2012 | Park | G06F 3/0486 715/769 |

FOREIGN PATENT DOCUMENTS

KR    10-2014-0056910 A    5/2014

* cited by examiner

*Primary Examiner* — Carolyn R Edwards
*Assistant Examiner* — Bipin Gyawali
(74) *Attorney, Agent, or Firm* — Birch, Stewart, Kolasch & Birch, LLP

(57) ABSTRACT

A display device and a method for controlling the same are disclosed. The method for controlling a display device comprises a display unit configured to display visual information, including a private region and a public region; a control input sensing unit configured to detect a control input and to deliver the detected control input to a processor; and the processor configured to control the display unit and the control input sensing unit. In this case, the processor may display a control object in the private region, detect a first control input, move the control object from the private region to a first position of the public region based on the detected first control input and display a control indicator corresponding to the control object in a second position of the private region. In this case, the second position may be set based on the first position of the control object.

19 Claims, 17 Drawing Sheets

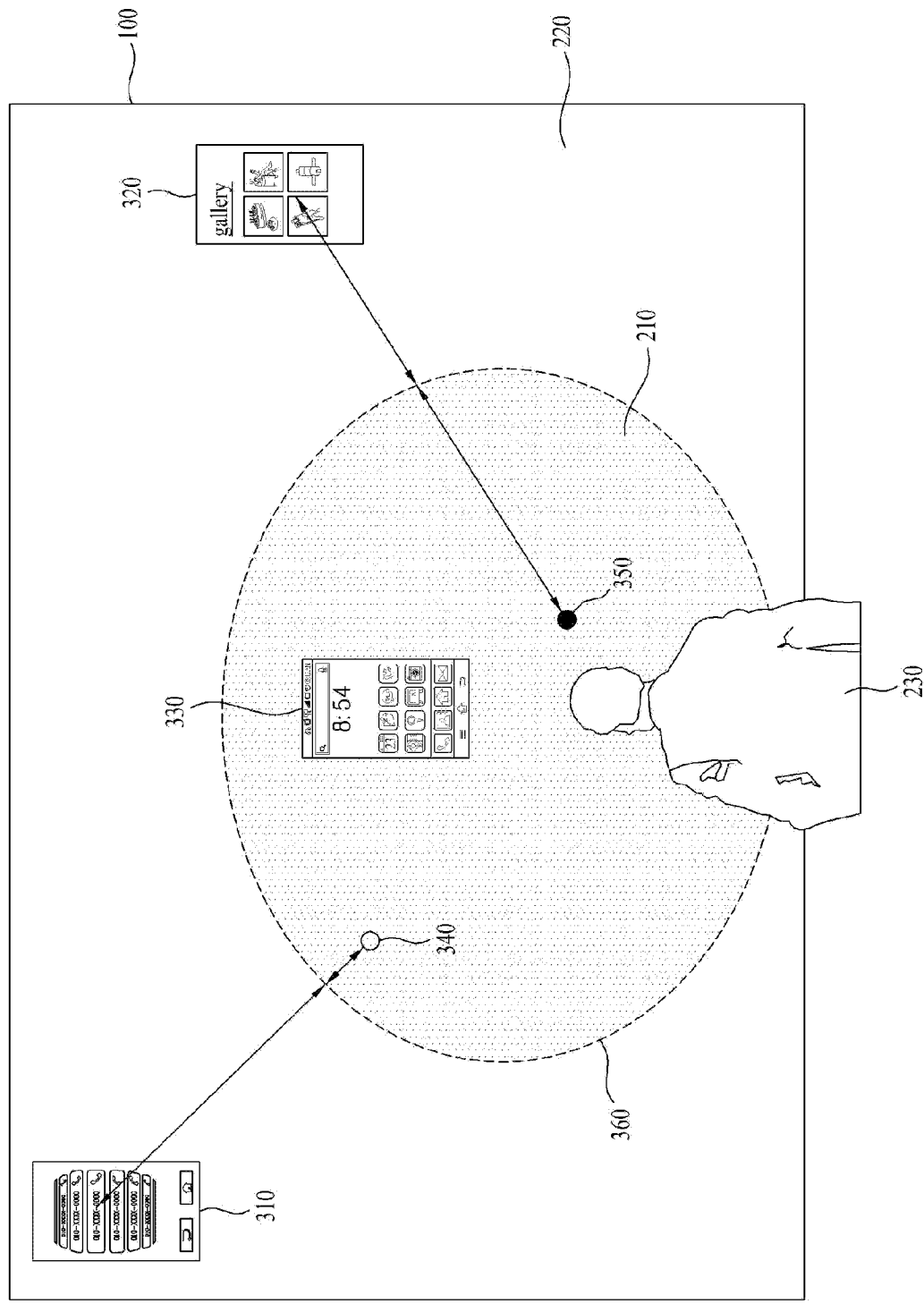

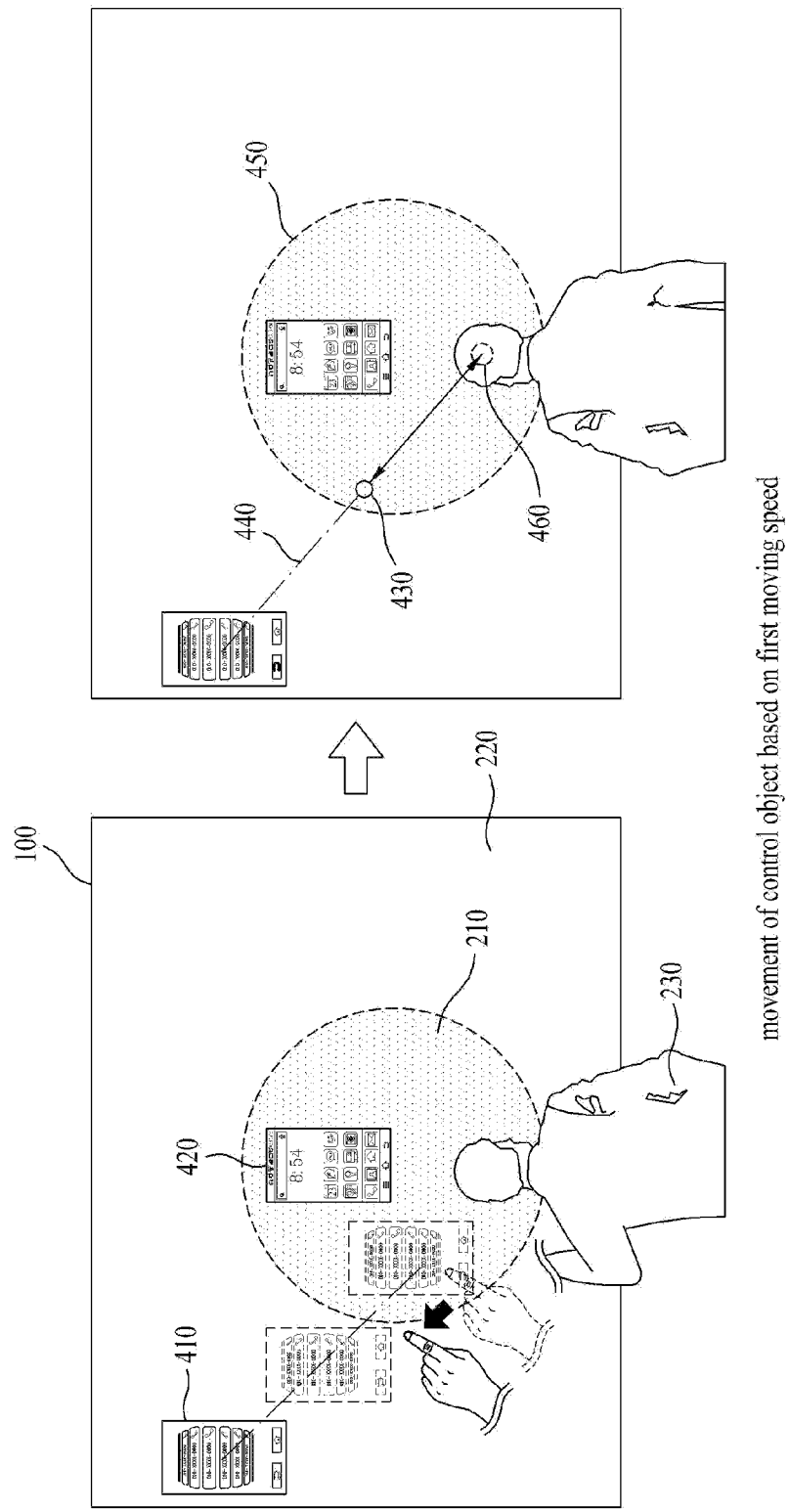

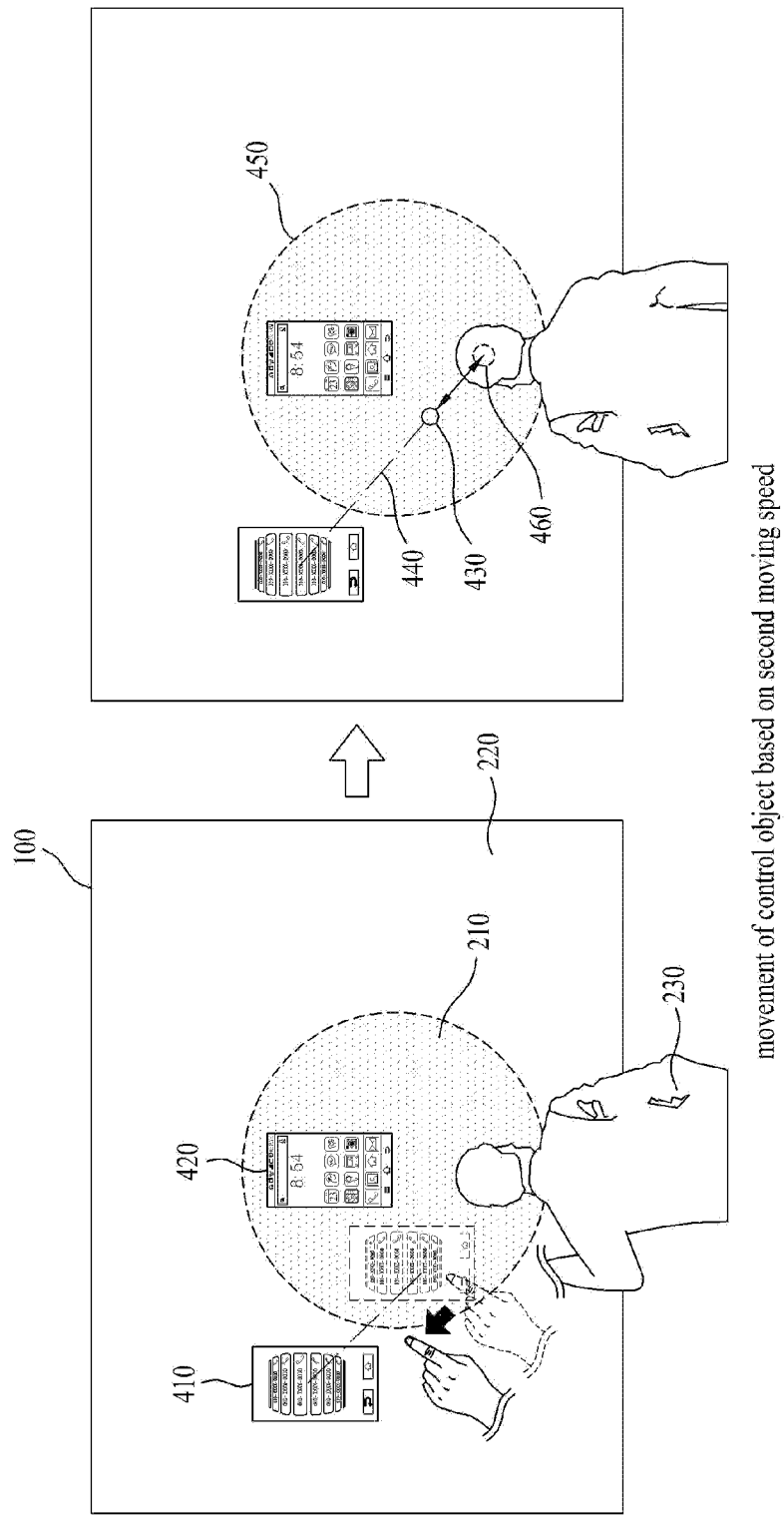

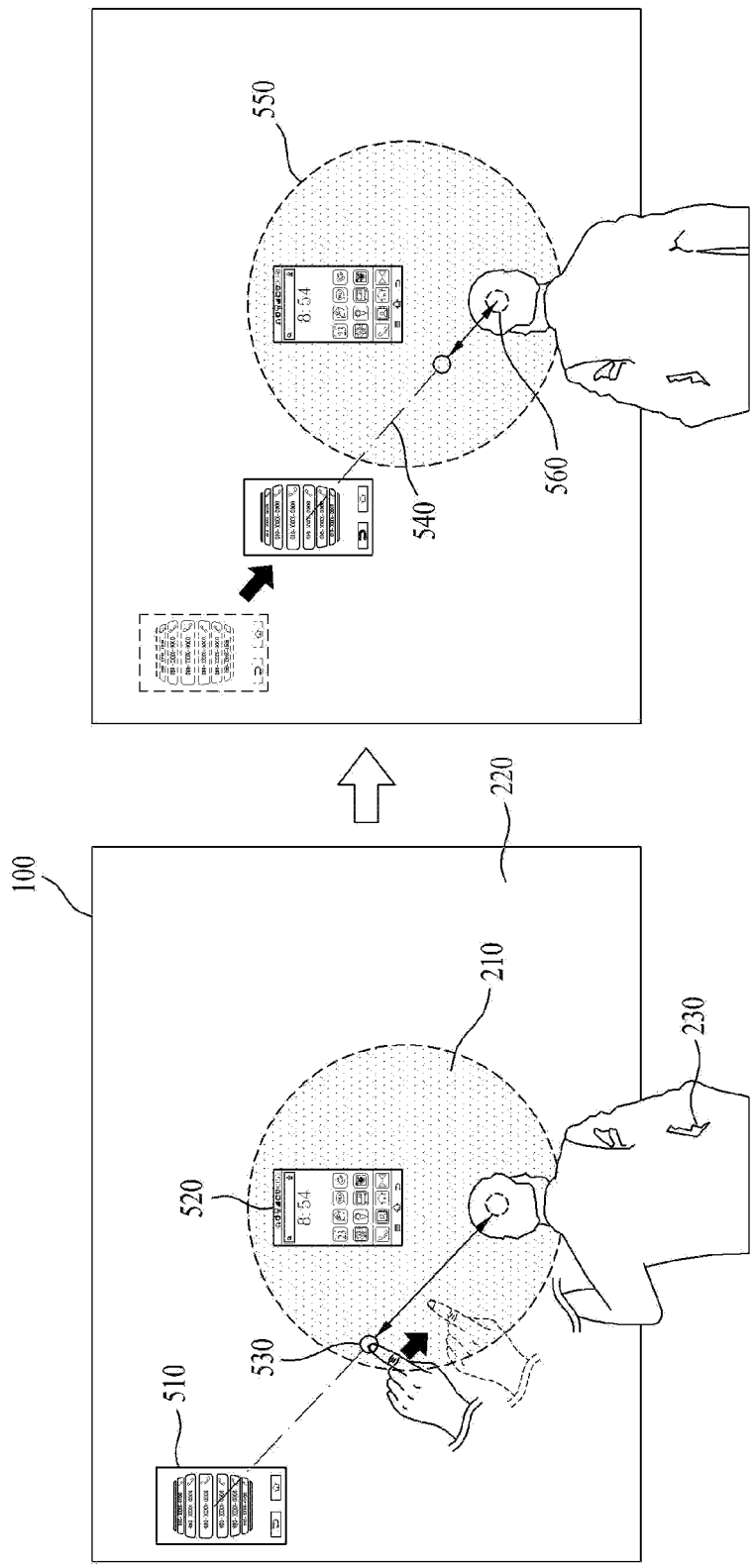

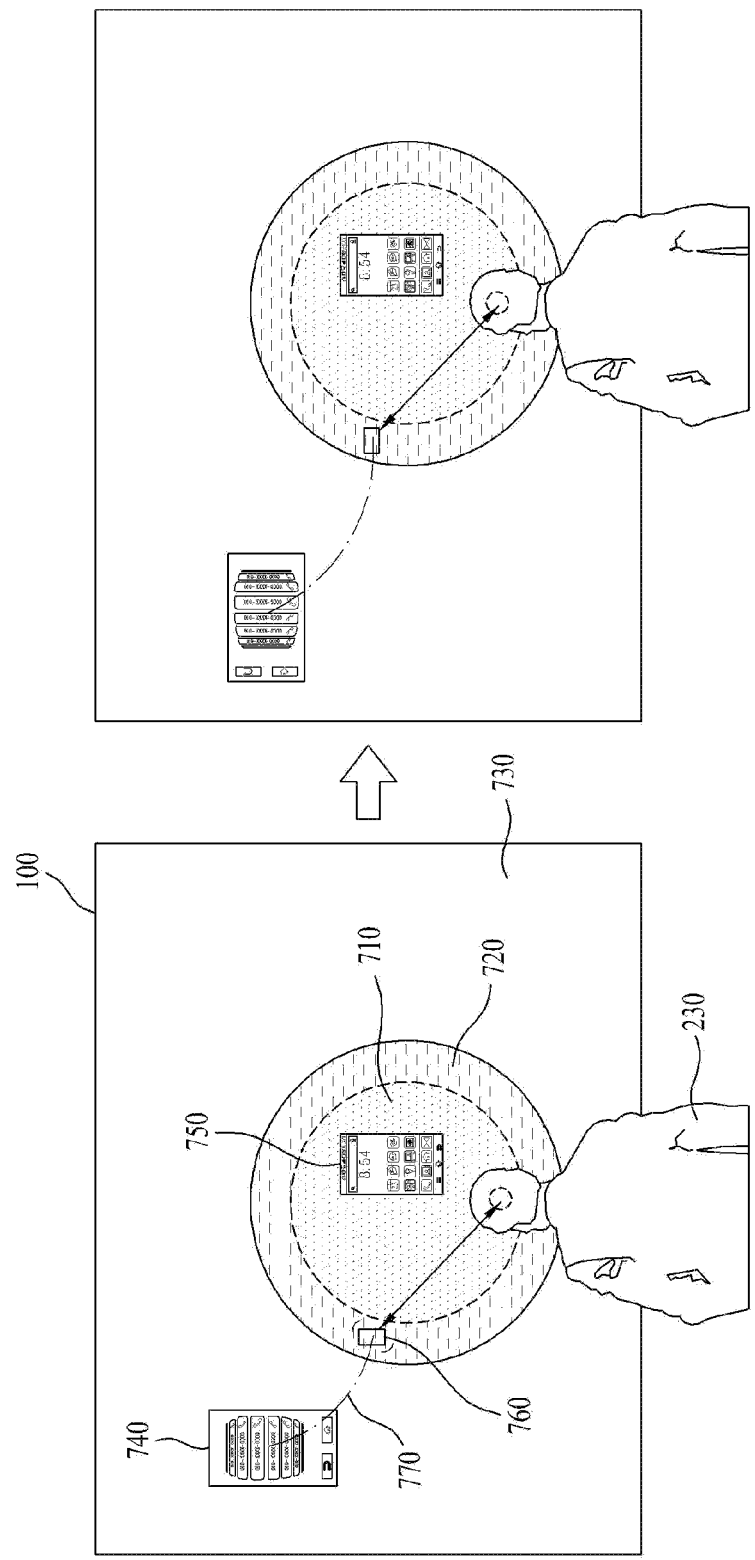

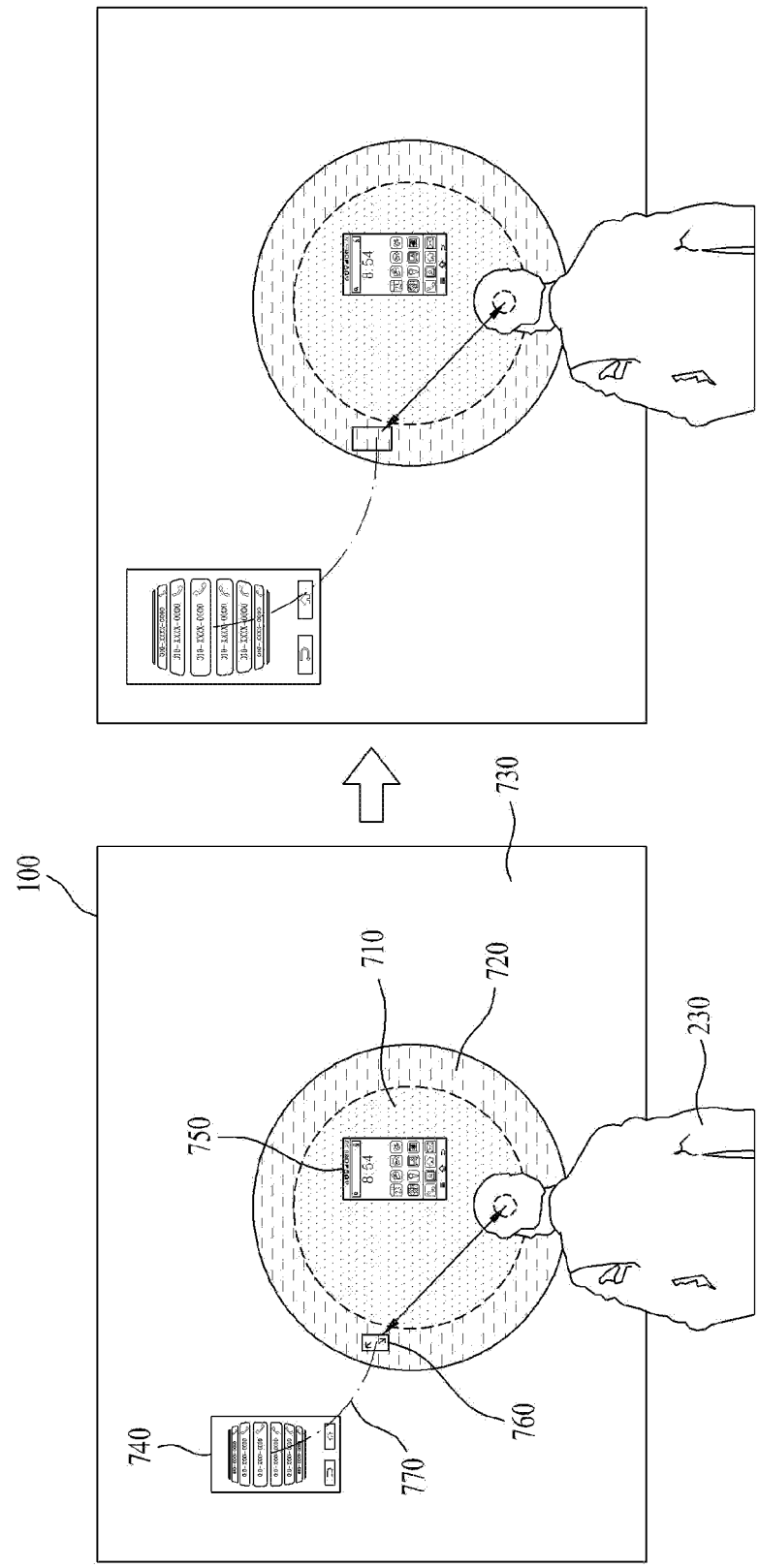

DISPLAY DEVICE AND METHOD FOR CONTROLLING THE SAME

This application claims the benefit of the Korean Patent Application No. 10-2014-0092476, filed on Jul. 22, 2014, which is hereby incorporated by reference as if fully set forth herein.

BACKGROUND OF THE INVENTION

Field of the Invention

The present specification relates to a display device and a method for controlling the same.

Discussion of the Related Art

Recently, enlargement and light weight of a display device have been accelerated. Also, a thickness of the display device has been gradually thinned in accordance with miniaturization of parts. With this trend, a wall-hanging type TV has been popularized. Also, an enlarged display device has detected an input of a user, and has performed an operation based on the detected input. This interactive enlarged display device may be used as a device that interacts with a user in various places such as an exhibition center, a theater, a fashion store, an information desk, a restaurant, a hotel lobby, and a gallery. Also, it seems that the trend towards enlargement and light weight of the display device will continue in the future. Accordingly, it seems that use of an enlarged display which is interactive with a user will be increased rapidly.

The enlarged display device may be used by a plurality of users. In more detail, the enlarged display device may have a size enough to be used by a plurality of users. At this time, the display device used by a plurality of users needs to identify use regions for the respective users from each other. Also, it is required to restrict or identify some use regions of the enlarged display device by considering features of the users or features of a public region. Accordingly, the need of a method for identifying and controlling use regions among a plurality of users in an enlarged display device has been required.

SUMMARY OF THE INVENTION

Accordingly, the present specification is directed to a display device and a method for controlling the same, which substantially obviate one or more problems due to limitations and disadvantages of the related art.

An object of the present specification is to provide a display device that provides a display unit which includes a private region and a public region.

Another object of the present specification is to provide a method for moving a control object from a private region to a public region and displaying a control indicator in the private region.

Still another object of the present specification is to provide a method for setting a position where a control object is moved in a public region based on a control input that moves the control object.

Further still another object of the present specification is to provide a method for setting a position of a control indicator within a private region based on a position of a control object within a public region.

Further still another object of the present specification is to provide a method for setting a position of a control object and a position of a control indicator based on a predetermined reference point.

Further still another object of the present specification is to provide a method for controlling a control object by using a control indicator.

Further still another object of the present specification is to provide a display device that further includes an editing region within a private region, and a method for setting a control mode based on a position of a control object.

Further still another object of the present specification is to provide a method for detecting a position of eyes of a user by using a camera unit and setting a private region and a public region based on the location of eyes of the user.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device according to one embodiment comprises a display unit configured to display visual information, including a private region and a public region; a control input sensing unit configured to detect a control input and to deliver the detected control input to a processor; and the processor configured to control the display unit and the control input sensing unit. In this case, the processor may display a control object in the private region, detect a first control input, move the control object from the private region to a first position of the public region based on the detected first control input and display a control indicator corresponding to the control object in a second position of the private region. In this case, the second position may be determined based on the first position of the control object.

In another aspect of the present specification, a method for controlling a display device comprises the steps of displaying a control object in a private region; detecting a first control input; moving the control object from the private region to a first position of a public region based on the detected first control input; and displaying a control indicator corresponding to the control object in a second position of the private region. In this case, the second position may be determined based on the first position of the control object.

According to the present specification, the display device and the method for controlling the same may be provided.

Also, according to the present specification, the display device may provide a display unit which includes a private region and a public region.

Also, the display device may move a control object from a private region to a public region and display a control indicator in the private region.

Also, the display device may set a position where the control object is moved in the public region based on a control input that moves the control object.

Also, the display device may set a position of the control indicator within the private region based on a position of the control object within the public region.

Also, the display device may set the position of the control object and the position of the control indicator based on a predetermined reference point.

Also, the display device may control the control object by using the control indicator.

Also, the display device may further include an editing region within the private region, and may set a control mode based on the position of the control object.

Also, the display device may detect a location of eyes of a user by using a camera unit and set the private region and the public region based on the location of eyes of the user.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIGS. 3a to 3c are diagrams illustrating a method for allowing a display device to move a control object from a private region to a public region and display the control object in accordance with one embodiment of the present specification;

FIGS. 4a and 4b are diagrams illustrating a method for allowing a display device to move a control object based on a moving speed of a control input in accordance with one embodiment of the present specification;

FIGS. 5a and 5b are diagrams illustrating a method for allowing a display device to control a control object by using a control indicator in accordance with one embodiment of the present specification;

FIGS. 7a and 7b are diagrams illustrating a method for allowing a display device to control a control object in an editing region in accordance with one embodiment of the present specification;

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the embodiments of the present invention will be described in detail with reference to the accompanying drawings and the disclosure described by the drawings, it is to be understood that the present invention is not limited by such embodiments.

Although the terms used in the present specification are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Although the terms such as "first" and/or "second" in this specification may be used to describe various elements, it is to be understood that the elements are not limited by such terms. The terms may be used to identify one element from another element. For example, a first element may be referred to as a second element or vice versa within the range that departs from the scope according to a concept of the present specification.

Also, in the specification, when a module "includes" an element, it means that the module may further include another element unless otherwise specified. The suffixes " . . . unit" and " . . . module" for the elements used in the specification are given or used to mean a unit for processing at least one function or operation, and may be implemented by combination of hardware and/or software.

Figure 1:
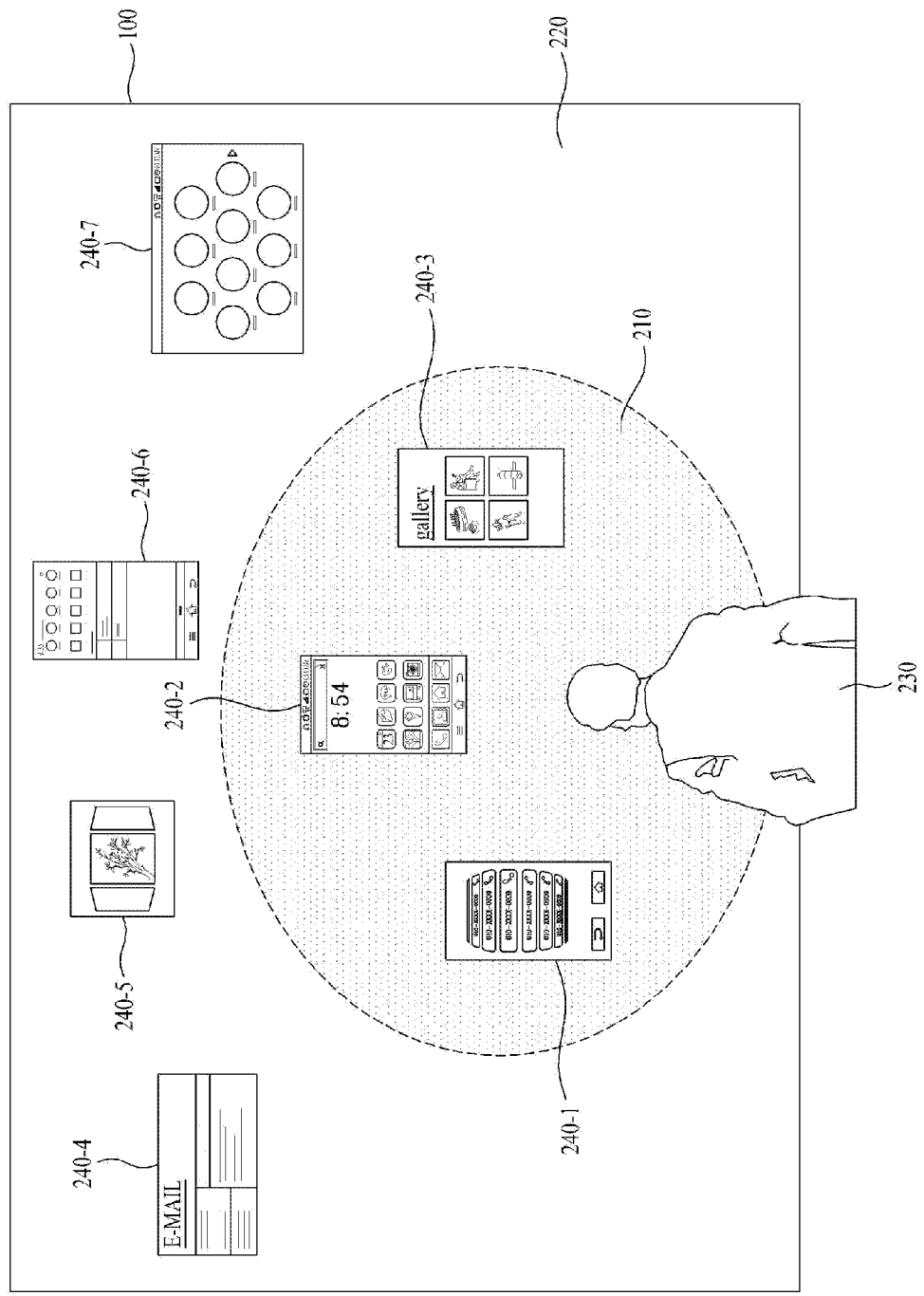
FIG. 1 is a diagram illustrating a display device that includes a private region and a public region in accordance with one embodiment of the present specification.

FIG. 1 is a diagram illustrating a display device that includes a private region and a public region in accordance with one embodiment of the present specification. The display device 100 may be an enlarged display device or a wall display device. At this time, the enlarged display device may be a device that includes a large display region that may be used by a plurality of users. Also, the wall display device may be a display device that is used by being built in a wall or other attachable location. For example, the wall display device may be used by being built in various places such as an exhibition center, a theater, a fashion store, an information desk, a restaurant, a hotel lobby, and a gallery. Also, the wall display device may be an enlarged display device built in a wall, and may be used by a plurality of users. In other words, the display device 100 disclosed in this specification may be a device that includes a large display region that may be used by a plurality of users. However, in accordance with one embodiment of the present specification, the display device 100 is a device that includes a plurality of regions even in the case that the display device 100 has a small size, and if the display device 100 includes a private region and a public region, the present invention may equally be applied to the display device, and the display device 100 is not limited to the aforementioned embodiment.

The display device 100 may include a private region 210 and a public region 220. At this time, the private region may be a region set based on a user. In more detail, the private region may be a region of a display unit 110 of the display device 100, wherein the region may be used by a specific user 230 only. At this time, the private region 210 may be a region where an access power is limited based on a user. For example, if a first user uses the display device 100, the display device 100 may set a first private region based on the first user. Also, if a second user uses the display device 100, the display device 100 may set a second private region based on the second user. Also, for example, the private region 210 may be set based on a security level set by a user or a processor 150. At this time, the security level may be set differently depending on a user who is authorized or not. In other words, the private region 210 may be set based on the user, and is not limited to the aforementioned embodiment.

The public region 220 may be a region accessed to all the users who use the display device 100. In more detail, the display device 100 may set a region of the display unit 110, which is not the private region 210, as a public region. For example, an object located in the public region 220 may be used by all the users. In other words, the public region 220 may be a region that may be used by all the users. If the display device 100 set the private region 210 and the public region 220, the display device 100 may detect a user and set the private region 210 based on the user. In more detail, the display device 100 may detect a user by using at least one of a camera unit 130 and a sensor unit 140. At this time, for example, the display device 100 may detect a location of eyes of the user by using at least one of the camera unit 130 and the sensor unit 140. At this time, the display device 100 may set a region within a first distance from the detected location of eyes of the user as the private region 210. At this time, the first distance may be a region set by the user or the processor 150. Also, for example, the display device 100 may further detect an arm length of the user by using the camera unit 130 and the sensor unit 140, and may set the first distance based on the arm length of the user. In other words, the display device 100 may set the private region 210 by considering the region that may be used by the user. Also, for example, the display device 100 may detect a location of the display unit 110, which corresponds to at least one of a face center and a body center of the user. At this time, the display device 100 may set a region with the first distance from the corresponding location of the display unit 110 as the private region 210. Also, the display device 100 may set a region of the display unit 110, which excludes the private region 210, as the public region 220. Also, the display device 100 may include a plurality of private regions 210 based on a plurality of users. At this time, if a first private region and a second private region are set, the display device 100 may set the region that excludes the first private region and the second private region of the display unit 110 as the public region. Also, the display device 100 may display control objects 240-1, 240-2, 240-3, 240-4, 240-5, 240-6 and 240-7. At this time, the control objects may be objects controlled by a user who uses the display device 100. At this time, for example, the control object may be at least one of a user interface, an application, an icon, and a file. In more detail, the control object may be visual information controlled by the user of the display device 100 and displayed in the display unit 110 to implement an operation. At this time, for example, the control object may be located in the private region 210 or the public region 220. For example, if the control object is located in the private region 210, the control object may be controlled by a user who is allowed to access the private region 210. Also, for example, if the control object is located in the public region 220, the control object may be controlled by all the users who use the display device 100. In other words, the control object may be controlled differently depending on a control method based on the location within the display unit 110.

Figure 2:
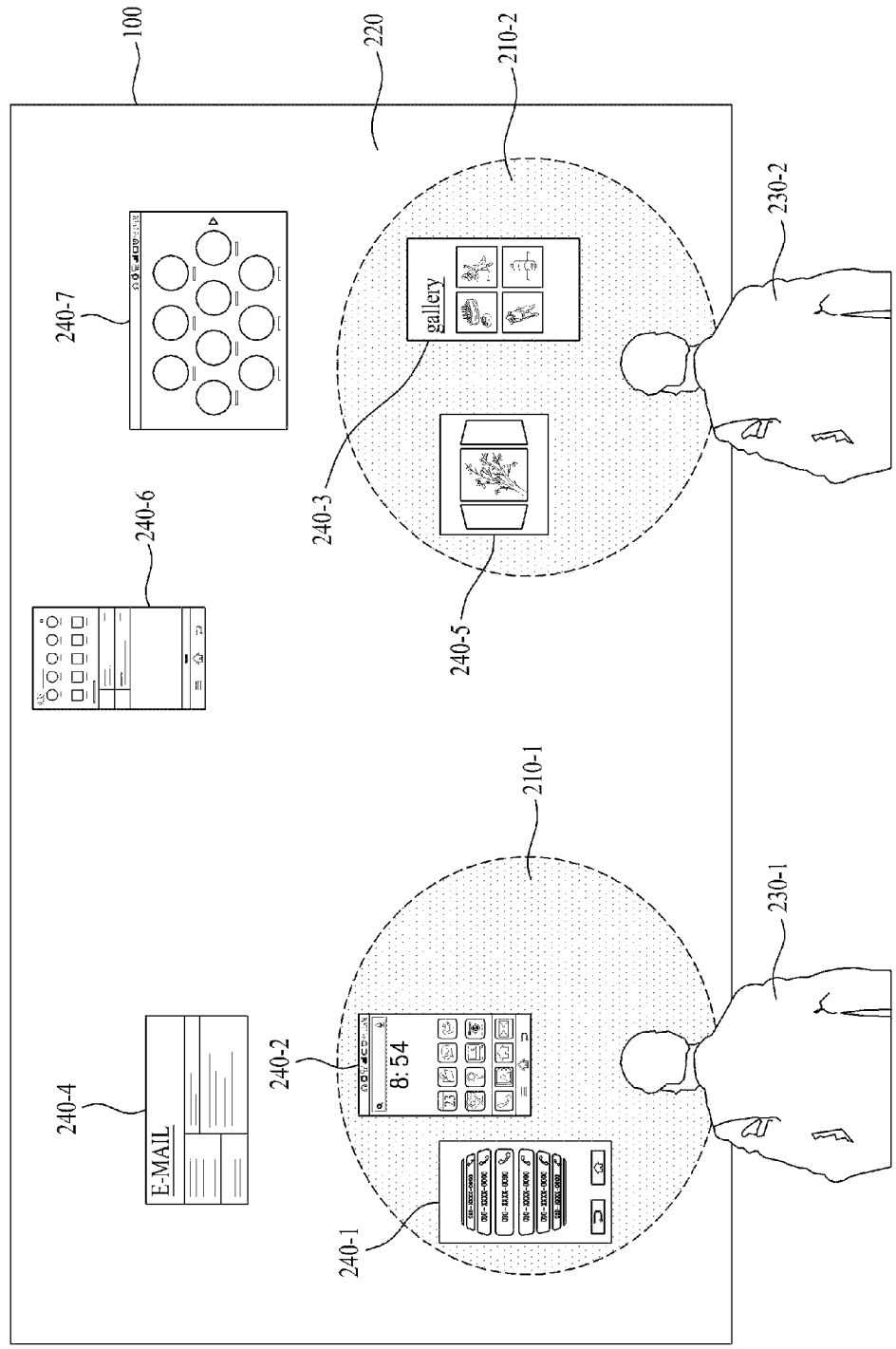
FIG. 2 is a diagram illustrating a display device used by a plurality of users in accordance with one embodiment of the present specification.

FIG. 2 is a diagram illustrating a display device used by a plurality of users in accordance with one embodiment of the present specification. The display device 100 may include a first private region 210-1 and a second private region 210-2 as described above. At this time, the display device 100 may set a region other than the first private region 210-1 and the second private region 210-2 as the public region 220. In this case, for example, the first private region 210-1 may be controlled by the first user 230-1. Also, the second private region 210-2 may be controlled by the second user 230-2. In other words, the respective private regions 210-1 and 210-2 may be controlled by their respective users different from each other. In more detail, the control objects 240-1 and 240-2 displayed in the first private region 210-1 may be controlled by the first user 230-1. In other words, the display device 100 may detect a control input of the first user 230-1. The display device 100 may control the control objects 240-1 and 240-2 displayed in the first private region 210-1 based on the detected control input and implement a related operation. Also, the control objects 240-3 and 240-5 displayed in the second private region 210-2 may be controlled by the second user 230-2. In other words, the display device 100 may detect a control input of the second user 230-2. The display device 100 may control the control objects 240-3 and 240-5 displayed in the second private region 210-2 based on the detected control input and implement a related operation. Also, the control objects 240-4, 240-6 and 240-7 displayed in the public region 220 may be controlled by the first user 230-1 and the second user 230-2. At this time, for example, if the control object displayed in the public region 220 is moved to the first private region 210-1, the control object may be controlled by the first user 230-1 only. In other words, the display device 100 may use a control method which is varied depending on the position where the control objects 240-1, 240-2, 240-3, 240-4, 240-5, 240-6 and 240-7 are displayed.

Figure 3A:
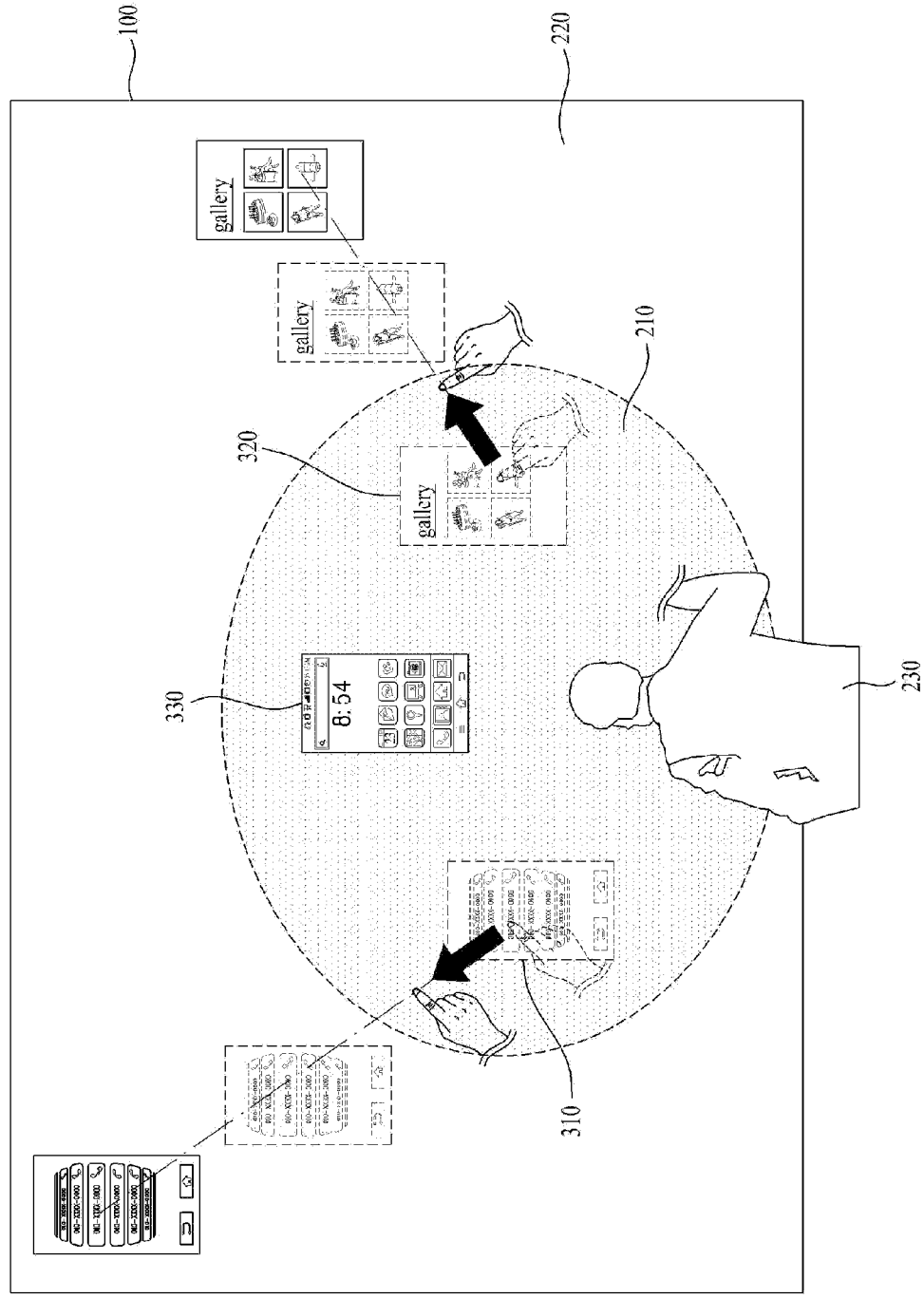
Figure 3C:
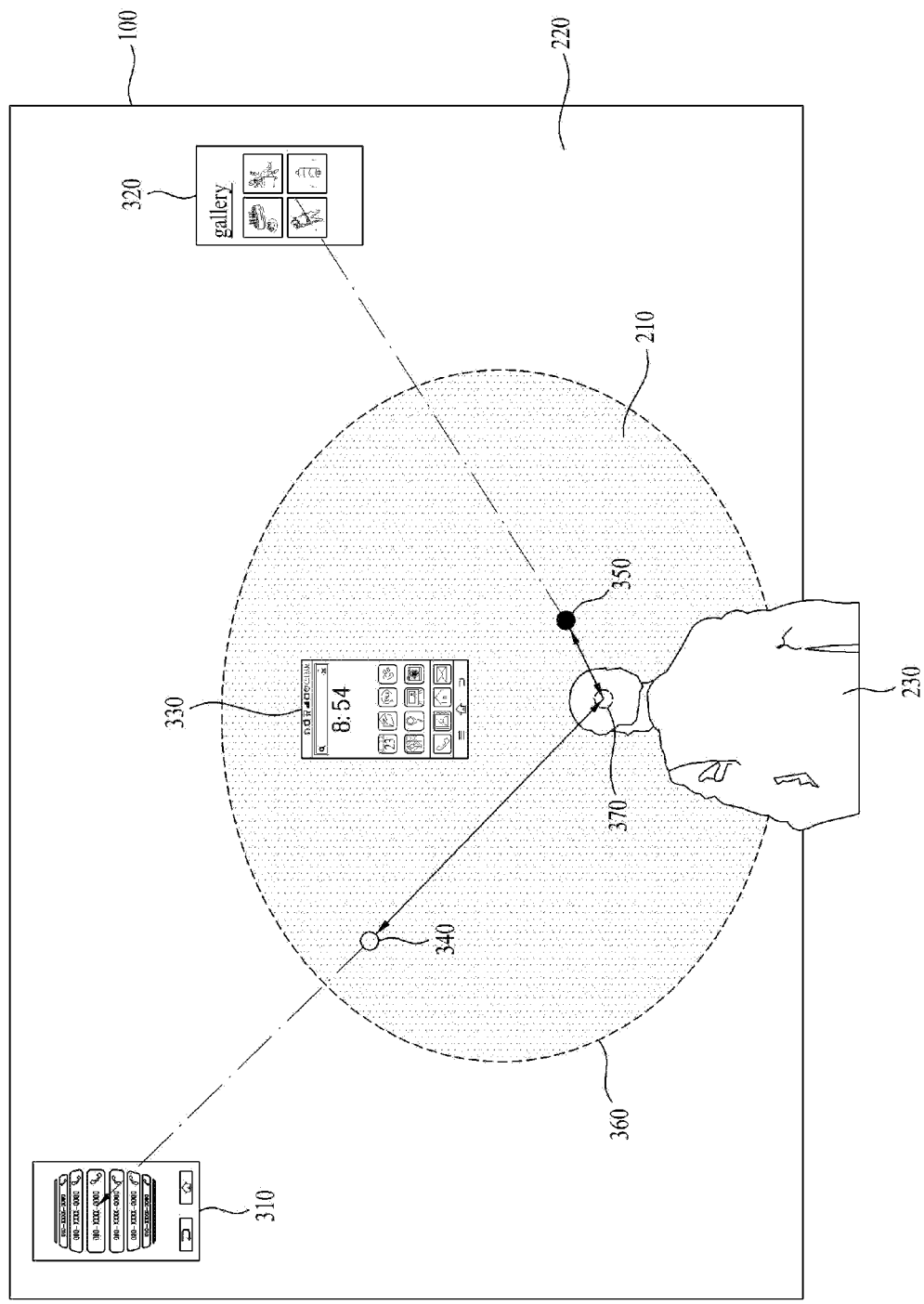

FIGS. 3a to 3c are diagrams illustrating a method for allowing a display device to move a control object from a private region to a public region and display the control object in accordance with one embodiment of the present specification.

The display device 100 may detect a first control input. The display device 100 may move a first control object 310 from the private region 210 to a first position of the public region 220 based on the detected first control input. At this time, the display device 100 may display a first control indicator 340 corresponding to the first control object 310 in a second position. In this case, the display device 100 may set the second position based on the first position.

In more detail, referring to FIG. 3a, the display device 100 may detect the first control input. At this time, the first control input may be the input moved in a first direction. Also, the first control input may be the input moved at a first moving speed. At this time, for example, the first control input may be at least one of a touch input and a gesture input. Also, the first direction may be the direction set based on a predetermined reference point 370 within the private region 210. For example, the predetermined reference point may be the point of the display unit, where eyes of the user reach. Also, for example, the predetermined reference point 370 may be the point set by the user or the processor 150, and is not limited to the aforementioned example. Also, for example, the first direction may be determined based on a starting point of the first control input. In other words, the first direction may be the direction to which the first control input is moved.

Also, if the display device 100 detects the first control input, the display device 100 may move the first control object 310 from the private region 210 to the public region 220. At this time, the display device 100 may determine the distance where the first control object 310 is moved, based on a first moving speed of the first control input. In more detail, if the first moving speed of the first control input is increased, the display device 100 may farther move the first control object 310 from the position where the first control object 310 is first displayed. In other words, the first control object 310 may be moved to a point far away from the private region 210. For example, the first control object 310 may be moved from the private region 210 to the first position of the public region 220 based on the first control input. At this time, the first position may be the point far away from the boundary between the private region 210 and the public region 220 equal to or less than a first distance. At this time, the boundary 360 between the private region 210 and the public region 220 may be the point where the first control object 310 passes while moving from the private region 210 to the public region 220. In other words, the first position may be set to a point far away from the boundary 360 between the private region 210 and the public region 220 equal to or less than the first distance based on the moving path of the first control object 310.

Also, referring to FIG. 3b, the display device 100 may display a first control indicator 340 in the second position of the private region 210. At this time, the first control indicator 340 may be the indicator indicating that the first control object 310 is located in the public region 220. Also, for example, the first control indicator 340 may be the indicator for controlling the first control object 310.

The display device 100 may set the second position where the first control indicator is displayed, based on the first position. In more detail, the second position may be set to a point far away from the boundary 360 between the private region 210 and the public region 220 equal to or less than a second distance. At this time, the second position may be located in the private region 210. Also, for example, the second distance may be set based on the first distance which is the distance from the boundary 360 between the private region 210 and the public region 220 to the first position. At this time, if the first distance is increased, the display device 100 may reduce the second distance. In other words, the display device 100 may display the first control indicator 340 to be close to the boundary 360 between the private region 210 and the public region 220 as the first control object 310 becomes far away from the boundary 360 between the private region 210 and the public region 220. At this time, the first control object 310 may be located in the public region 220, and the first control indicator 340 may be located in the private region 210. As a result, the display device 100 may deliver position information of the first control object 310 within the public region 220 to the user through the first control indicator 340 within the private region 210.

Also, referring to FIG. 3c, the display device 100 may set the first position and the second position to be located in a first direction equally from the predetermined reference point 370. In other words, the display device 100 may allow the first position and the second position to be located on the same line from the predetermined reference point 370. At this time, for example, the display device 100 may set the point far away from the predetermined reference point 370 equal to or less than the first distance, to the first position. Also, the display device 100 may set the point far away from the predetermined reference point 370 equal to or less than the second distance, to the second position. At this time, for example, if the first distance is increased, the display device 100 may increase the second distance. In other words, if the first position becomes far away from the predetermined reference point 370, the second position may become far away from the predetermined reference point 370.

For another example, the display device 100 may detect the second control input. At this time, the display device 100 may move the second control object 320 from the private region 210 to the public region 220 based on the detected second control input. The second control input may be moved in a second direction. Also, the second control input may have a second moving speed. At this time, the display device 100 may display the second control input 320 in a third position. Also, the display device 100 may display the second control indicator 350 in a fourth position. At this time, for example, the third position and the fourth position may be determined based on the boundary 360 between the private region 210 and the public region 220. In this case, if the third position is closer to the boundary 360 between the private region 210 and the public region 220 than the first position, the fourth position may be located from the boundary 360 between the private region 210 and the public region 220 farther than the second position. In other words, the display device 100 may display the control indicator based on the distance between the boundary 360 between the private region 210 and the public region 220 and the control object.

For another example, the third position and the fourth position may be located equally in a second direction based on the predetermined reference point 370. At this time, the third position may be the point far away from the predetermined reference point 370 equal to or less than a third distance. Also, the fourth position may be the point far away from the predetermined reference point 370 equal to or less than a fourth distance. At this time, if the third distance is increased, the display device 100 may increase the fourth distance. In other words, if the second object 320 becomes far away from the predetermined reference point 370, the second control indicator 350 may be far away from the predetermined reference point 370. In other words, the display device 100 may set the position of the control indicator based on the moving position of the control object without limitation to the above example.

Also, for example, if the control object is position in the public region, the display device 100 may detect a control input that moves the control object from the public region 220 to the private region 210. At this time, the display device 100 may move the control object from the public region 220 to the private region 210 based on the control input. If the control object is moved to the private region 210, the display device 100 may terminate the display of the control indicator.

FIGS. 4a and 4b are diagrams illustrating a method for allowing a display device to move a control object based on a moving speed of a control input in accordance with one embodiment of the present specification.

Referring to FIGS. 4a and 4b, for example, the display device 100 may move a first control object 410 based on a first control input having a first moving speed. At this time, the first control object 410 may be moved to the first position of the public region 220. Also, the display device 100 may move the first control object 410 based on a second control input having a second moving speed. At this time, the first control object 410 may be moved to the second position of the public region 220. In this case, if the first moving speed is greater than the second moving speed, the first position may be located farther than the second position from a predetermined reference point 460. Also, for example, the first position may be located farther than the second position from the boundary 450 between the private region 210 and the public region 220. In other words, if the moving speed of the control input is increased, the display device 100 may move the control object to be located far away from the private region 210. Also, for example, the display device 100 may display a first control indicator 430 corresponding to the first control object 410 in the private region 210. At this time, if the first control object 410 is moved based on the first control input having the first moving speed, the display device 100 may display the first control indicator 430 in the third position. Also, if the first control object 410 is moved based on the second control input having the second moving speed, the display device 100 may display the first control indicator 430 in the fourth position. At this time, if the first moving speed is greater than the second moving speed, the third position may be located farther than the fourth position from the predetermined reference point 460. Also, for example, the third position may be located farther than the fourth position from the predetermined reference point 460. Also, for example, the third position may be located to be closer to the boundary 450 between the private region 210 and the public region 220 than the fourth position. In other words, if the moving speed of the control input is increased, the display device 100 may move the control object to be located far away from the private region 210. Also, the display device 100 may display the control indicator corresponding to the control object to be close to the boundary 450 between the private region 210 and the public region 220. As a result, the user may identify position information of the control object moved to the public region 220.

Figure 5B:
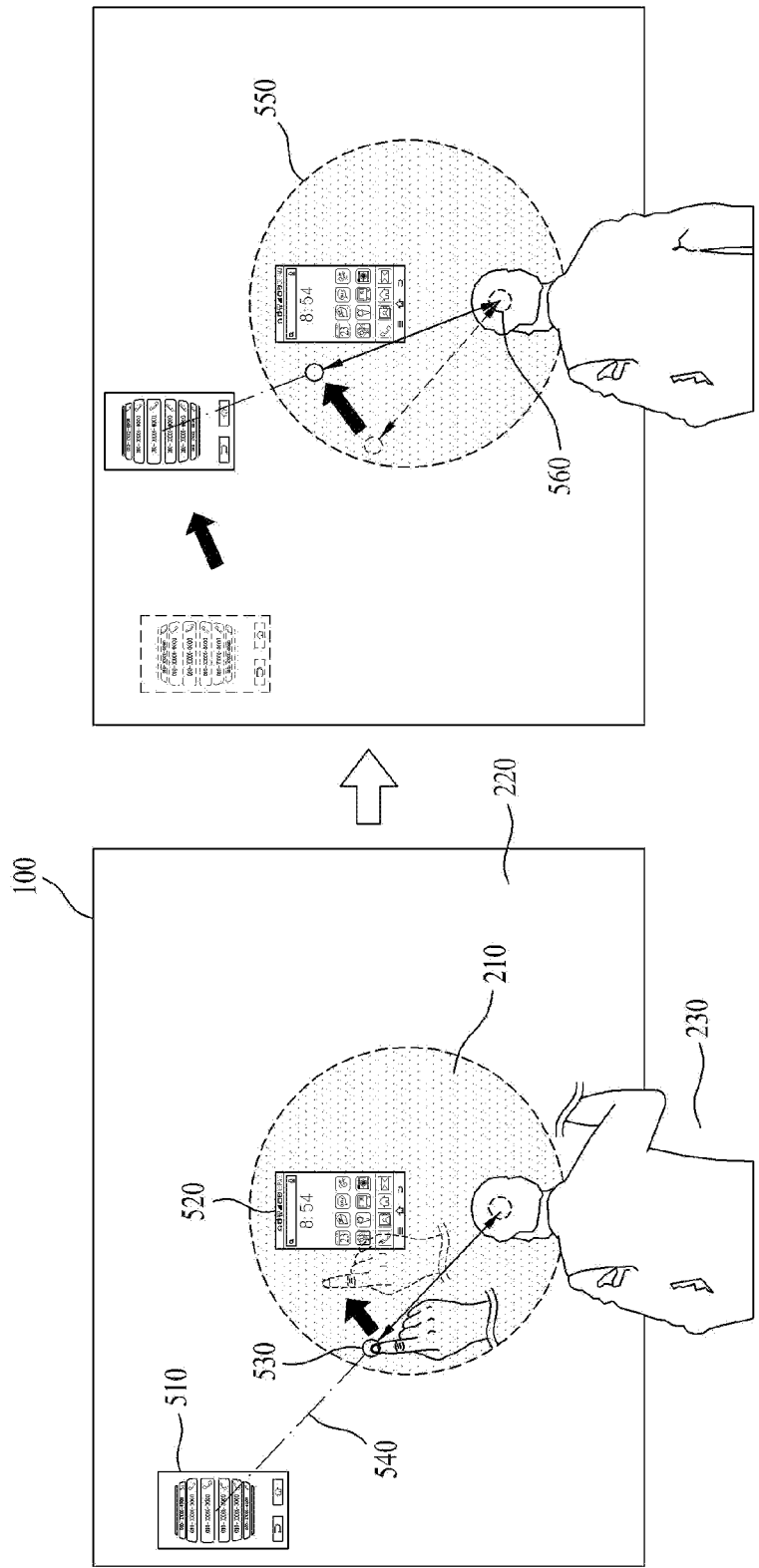

FIGS. 5a and 5b are diagrams illustrating a method for allowing a display device to control a control object by using a control indicator in accordance with one embodiment of the present specification.

The display device 100 may control a control object 510 by using a control indicator 530. At this time, for example, the display device 100 may control a distance and a direction of the control object 510 by using the control indicator 530. The display device 100 may detect a first control input. At this time, the first control input may be the input that moves the control indicator 530. If the control indicator 530 is moved based on the first control input, the display device 100 may move the control object 510. In more detail, referring to FIG. 5a, if the control indicator 530 is moved based on the first control input, a first distance of the control indicator 520 may be increased. At this time, the first distance may be the distance from the boundary 550 between the private region 210 and the public region 220 to the control indicator 530. If the first distance is increased, a second distance of the control object 510 may be reduced. At this time, the second distance may be the distance from the boundary 550 between the private region 210 and the public region 220 to the control object 510. In other words, if the control indicator 530 is moved towards the inside of the private region 210, the display device 100 may move the control object 510 to the private region 210. At this time, for example, if the moving speed of the control indicator 530 is fast, the control object 510 may be located to be closer to the boundary 550 between the private region 210 and the public region 210. Also, if the control indicator 530 is moved at a threshold distance or more, the display device 100 may move the control object 510 from the public region 220 to the private region 210. At this time, the threshold distance may be changed by the user or the processor 150. Also, the threshold distance may be determined based on the second distance which is the distance of the control object 510. In more detail, if the second distance is increased, the display device 100 may increase the threshold distance. In other words, the display device 100 move the control object 510 to the private region 210 by increasing the moving distance of the control indicator 530 if the control object is located far away from the boundary 550 between the private region 210 and the public region 220. As a result, the display device 100 may again move the control object 510, which is moved to the public region 220, to the private region 210. At this time, for example, if the control object 510 is moved to the private region 210, the display device 100 may terminate the display of the control indicator 530.

Also, for example, referring to FIG. 5b, the control indicator 530 may be moved from the first position to the second position based on the first control input. At this time, for example, the first position may be the point located in a first direction from a predetermined reference point 560. Also, for example, the second position may be the point located in a second direction from the predetermined reference point 560. The predetermined reference point 560 may be set by the user or the processor 150 in the private region 210 as described above. For example, the point where eyes of the user reach may be the reference point 560. If the control indicator 530 is moved from the first position to the second position, the display device 100 may move the control object 510 from the third position to the fourth position. At this time, for example, the third position may be the point located in a first direction from the predetermined reference point in the same manner as the first position. Also, the fourth position may be the point located in a second direction from the predetermined reference point in the same manner as the second position. In other words, the display device 100 may move the control object 510 to be located in the same direction from the reference point based on movement of the control indicator 530.

Figure 6A:
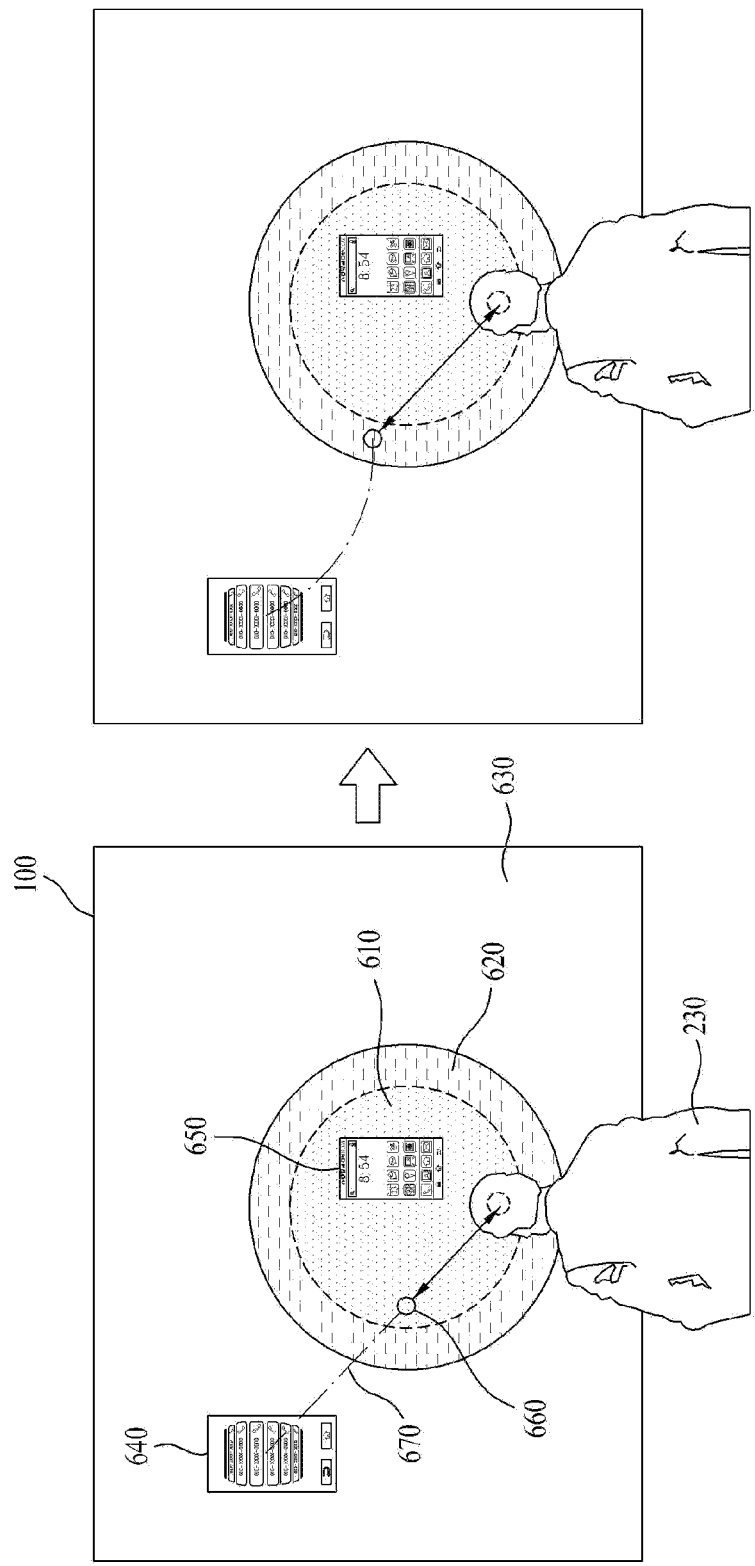
FIGS. 6a and 6b are diagrams illustrating a method for allowing a display device to control a control object based on an editing region in accordance with one embodiment of the present specification.
Figure 6B:
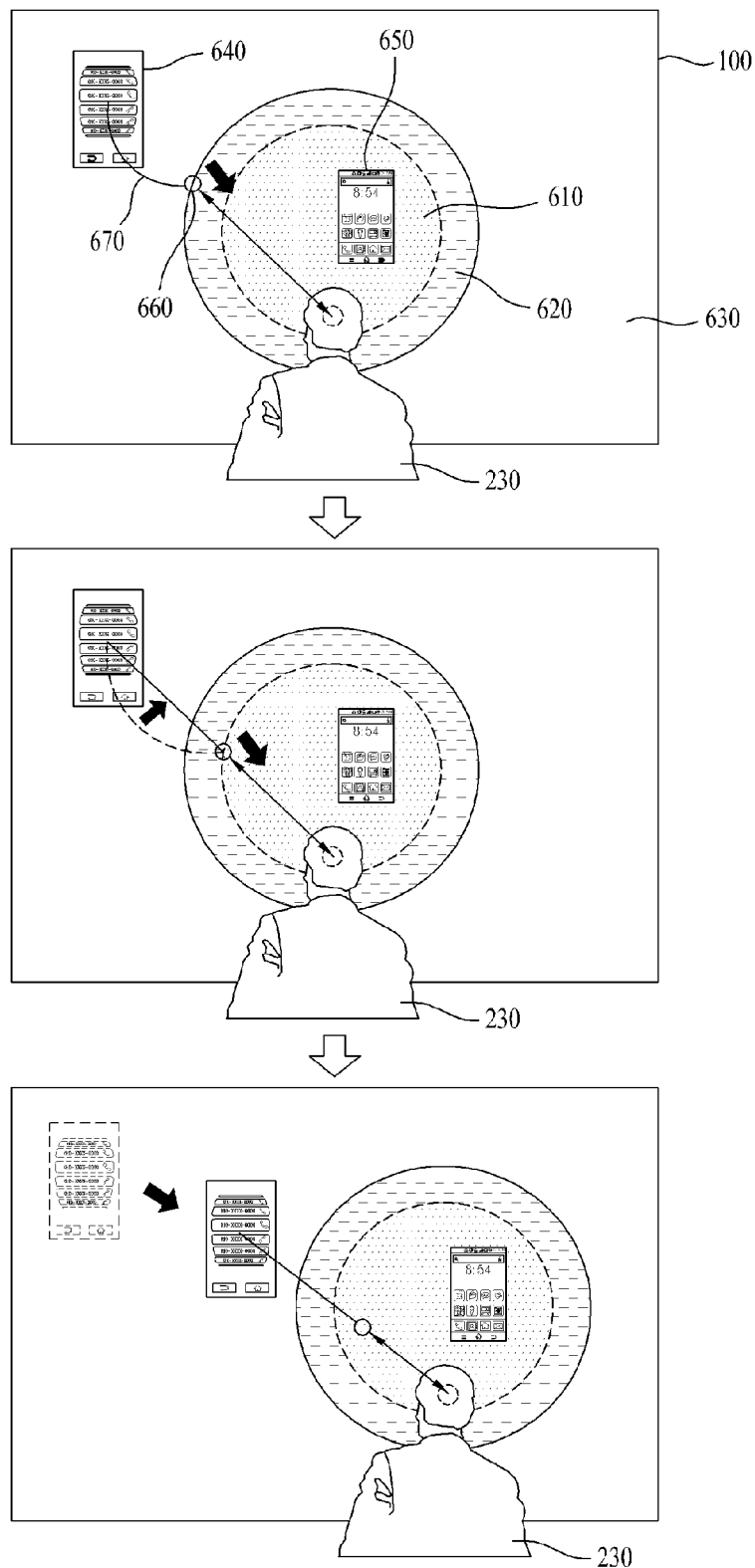

FIGS. 6a and 6b are diagrams illustrating a method for allowing a display device to control a control object based on an editing region in accordance with one embodiment of the present specification. The display unit 110 may include a private region 610. At this time, for example, the display unit 110 may further include an editing region 620 within the private region 610. For example, if the display device 100 moves a control indicator 660 within the editing region 620, the display device 100 may not move a control object 640. Also, if the display device 100 moves the control indicator 660 within the private region 610 not the editing region 620, the display device 100 may move the control object 640. In more detail, the display device 100 may change an object property only without moving the control object 640 in the editing region 620. In other words, the display device 100 may set a control method of the control object 640 differently depending on the position of the control indicator 660.

Also, for example, the display device 100 may further display a line indicator 670. At this time, the line indicator 670 may be the line shaped indicator that connects the control object 640 with the control indicator 670. Referring to FIG. 6b, if the control indicator 660 is located in the editing region 620, the line indicator may be set in a loose shape. At this time, the display device 100 may not move the control object 640 even though the control indicator 660 is moved. For example, if the control indicator 660 is moved to the boundary of the editing region 620, the line indicator 670 may be changed in a tight shape. Afterwards, if the control indicator 660 is moved to the private region 610 not the editing region 620, the display device 100 may move the control object 640 based on movement of the control indicator 660.

FIGS. 7a and 7b are diagrams illustrating a method for allowing a display device to control a control object in an editing region in accordance with one embodiment of the present specification.

If a first position of a control indicator 760 is located in an editing region 720, the display device 100 may control a control object 740 based on an editing mode. Also, for example, the display device 100 may set an indicating mode if the control indicator 760 is located in a private region 710 not the editing region 720. At this time, the display device 100 may set a control method of the control object 740 differently in the editing mode and the indicating mode. In more detail, the display device 100 may control an object property of the control object 740 in the editing mode by using the control indicator 760. At this time, for example, the object property may include at least one of a size and a display direction of the control object 740. Also, the display device 100 may set the control object 740 such that the object property of the control object 740 may not be changed in the indicating mode. In other words, the indicating mode may be the mode that indicates whether the control object 740 is located in a public region 730 but does not control the object property. As a result, the display device 100 may restrict a control power of the control object 740 by identifying the region.

In more detail, referring to FIG. 7a, the display device 100 may detect a first control input that rotates the control indicator 760. At this time, the display device 100 may rotate the control indicator 760 based on the first control input. At this time, the display device 100 may rotate the control object 740 in the same manner as the rotation direction of the control indicator 760. As a result, the user may change the object property even without moving the control object 740 to the private region 710.

For another example, referring to FIG. 7b, the display device 100 may detect a second control input that makes a size of the control indicator 760 be great. At this time, the display device 100 may increase the size of the control indicator 760 based on the second control input. At this time, the display device 100 may increase the size of the control object 740 in proportion to increase of the size of the control indicator 760. As a result, the user may change the object property even without moving the control object 740 to the private region 710.

For another example, the control indicator 760 may be the indicator that controls the control object 740 located in the public region 730. In other words, if the control indicator 760 is located in the private region 710, the display device 100 may control the control object 740 regardless of the fact that the control indicator 760 is located in the editing region 720. In more detail, if the control object 740 is located in the public region 730, the user may have a difficulty in inputting the control input that controls the control object 740. Accordingly, the display device 100 may control the control object 740 through the control indicator 760. At this time, for example, the display device 100 may rotate the control object 740 by rotating the control indicator 760. For another example, the display device 100 may terminate the display of the control object 740 by using the control indicator 760. For another example, the display device 100 may implement an operation through the control object 740 within the public region by using the control indicator 760. At this time, for example, the operation may be play of moving image, image display, etc. For another example, the display device 100 may move the control object 740 from the public region 730 to the private region 710 by using the control indicator 760. In other words, the display device 100 may control the control object 740 by using the control indicator 760 without limitation to the aforementioned embodiment.

For another example, the display device 100 may display a control interface to adjoin the control indicator 760 within the private region 710. At this time, for example, the control interface may be the interface that includes a control command for controlling the control object 740. Also, for example, the control interface may be the interface that makes the control command of the control object 740 be a menu. At this time, the display device 100 may control the control object 740 based on a control input that selects the control interface. In other words, the display device 100 may display an interface related to a control function of the control indicator 760 in the private region 710 without limitation to the aforementioned embodiment.

Figure 8:
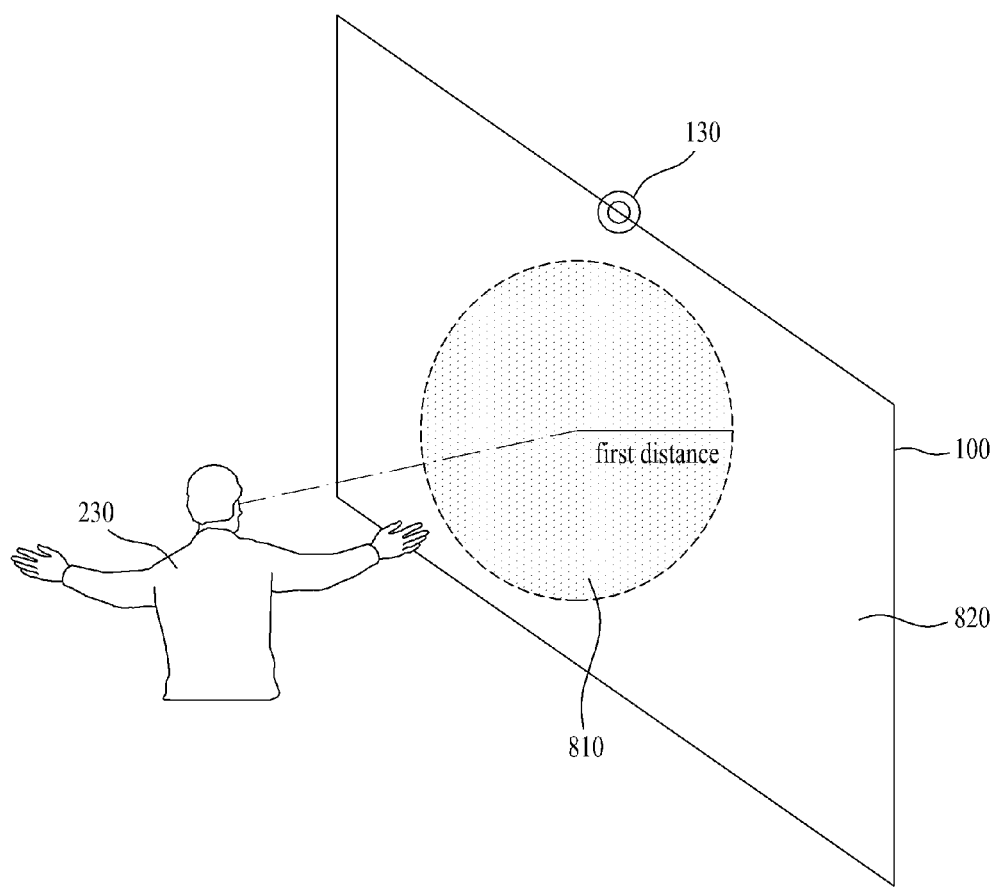
FIG. 8 is a diagram illustrating a method for allowing a display device to set a private region based on a user in accordance with one embodiment of the present specification.

FIG. 8 is a diagram illustrating a method for allowing a display device to set a private region based on a user in accordance with one embodiment of the present specification. The display device 100 may detect a user by using at least one of the camera unit 130 and the sensor unit 140. Also, for example, the display device 100 may further detect a location of eyes of the user by using at least one of the camera unit 130 and the sensor unit 140. At this time, for example, the display device 100 may set a region within a first distance from the detected location of eyes of the user as a private region 810. In this case, a point where eyes of the user reach may be a predetermined reference point as described above. At this time, the first distance may be changed by the user or the processor 150. Also, for example, the display device 100 may further detect an arm length of the user by using the camera unit 130 and the sensor unit 140. In other words, the display device 100 may set a region that may be used by the user as the private region 810. Also, for example, the display device 100 may set a region of the display unit 110, which is not the private region 810, as a public region 820. As a result, the display device 100 may set the private region 810, which is used by an individual, based on the user. Also, the display device 100 may set the public region 820 used by all the users, based on the private region 810.

Figure 9:
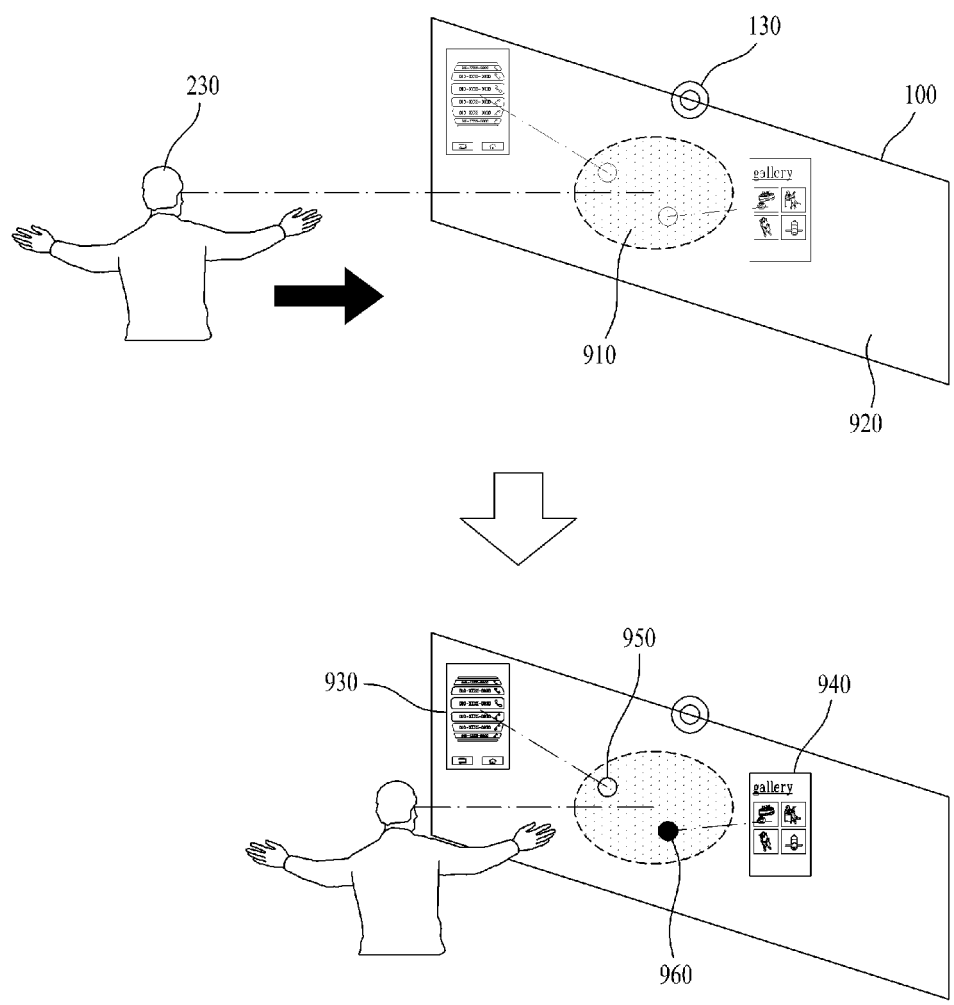
FIG. 9 is a diagram illustrating a method for allowing a display device to control a control object based on a distance with a user in accordance with one embodiment of the present specification.

FIG. 9 is a diagram illustrating a method for allowing a display device to control a control object based on a distance with a user in accordance with one embodiment of the present specification.

The display device 100 may further detect a distance from the display device 100 to the user by using at least one of the camera unit 130 and the sensor unit 140. At this time, the display device 100 may control a display method of control objects 930 and 940 and control indicators 950 and 960 based on the distance between the display device 100 and the user. In more detail, if the distance between the display device 100 and the user is more than a first threshold distance, the display device 100 may not display the control objects 930 and 940 and the control indicators 950 and 960. At this time, if the display device 100 detects that the distance with the user is within the first threshold distance, the display device 100 may display the control objects 930 and 940 and the control indicators 950 and 960. In other words, the first threshold distance may be a threshold distance that determines whether the user uses the display device 100. At this time, the first threshold distance may be changed by the user or the processor 150, and is not limited to the aforementioned embodiment. Also, for example, the display device 100 may control definition of the displayed control objects 930 and 940 and control indicators 950 and 960 based on the distance with the user. In more detail, the display device 100 may definitely display the control objects 930 and 940 and the control indicators 950 and 960 if the user is close to the display device 100. Also, the display device 100 may display dimly the control objects 930 and 940 and the control indicators 950 and 960 if the user is far away from the display device 100. At this time, definition may be set based on the distance between the user and the display device 100.

Figure 10:
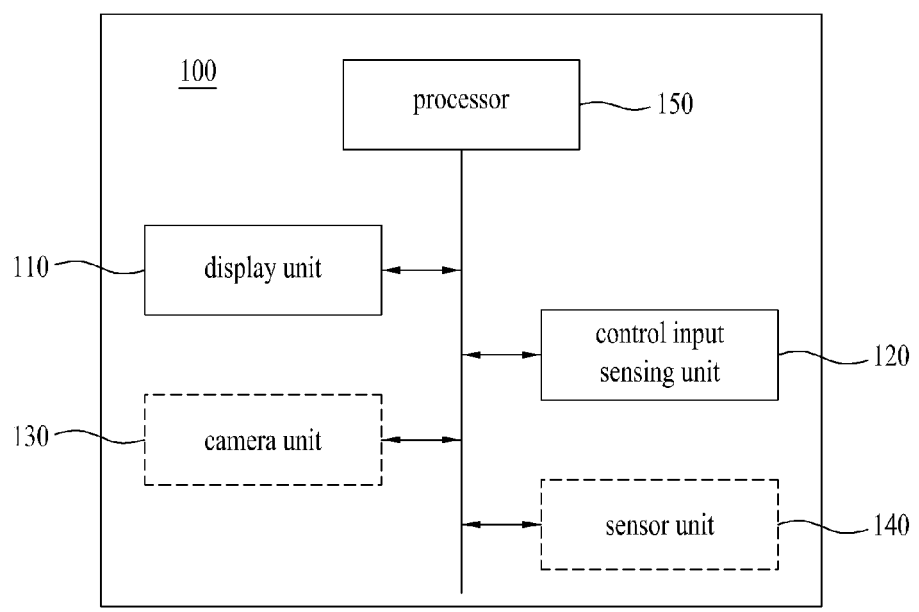
FIG. 10 is a block diagram illustrating a display device according to one embodiment of the present specification.

FIG. 10 is a block diagram illustrating a display device according to one embodiment of the present specification.

The display device 100 may include a display unit 110, a control input sensing unit 120, and a processor 150. Also, the display device 100 may further include a camera unit 130. Also, the display device 100 may further include a sensor unit 140.

The display unit 110 may be controlled by the processor 150. At this time, the display unit 110 may include a private region and a public region. Also, for example, the display unit 110 may further include an editing region. At this time, as described above, the private region may be the region to which an access power of the user is restricted. In other words, the private region is the region set to be used by a specific user only as described above. Also, the public region may be the region other than the private region. At this time, the public region may be the region to which an access power is allowed for all the users. Also, the editing region may be the region where a control method of a control object is set differently. In more detail, the editing region may be the region included in the private region. At this time, if the control object is located in the editing region of the private region, the display device 100 may control the control object based on the editing mode. At this time, if the control object is located in the region of the private region, which is not the editing region, the display device 100 may control the control object based on the indicating mode. In other words, the display device 100 may control the control object differently based on the position where the control object of the display unit 110 is displayed. At this time, the control object is visual information displayed in the display unit 110, and may be at least one of a user interface, an application, an icon and a file. Also, the control object may be the object displayed in the display unit 110 and controlled by the user, and is not limited to the aforementioned embodiment.

Also, for example, the display unit 110 may be a large display unit. In more detail, the display unit 110 may be a large display unit 110 which is large to be used by a plurality of users. Also, in accordance with one embodiment of the present specification, the display unit 110 is divided into a plurality of regions even though the display unit 110 includes a small display region, and may be a device that controls a control object differently based on the regions and is not limited to the aforementioned embodiment.

The control input sensing unit 120 may deliver a user input or an environment recognized by the device to the processor 150 by using at least sensor provided in the display device 100. In more detail, the control input sensing unit 120 may sense a control input of the user by using at least one sensor provided in the display device 100. In this case, at least one sensing means may include various sensing means for sensing a control input, such as a touch sensor, a fingerprint sensor, a motion sensor, a proximity sensor, an illumination sensor, a voice recognition sensor, and a pressure sensor. The control input sensing unit 120 refers to the aforementioned various sensing means, and the aforementioned sensors may be included in the device as separate elements, or may be incorporated into at least one element and included in the device. In other words, the control input sensing unit 120 may be the unit that senses a control input of the user, and is not limited to the aforementioned embodiment. Also, the control input sensing unit 120 may detect a multi-control input. In more detail, the control input sensing unit 120 may detect a plurality of control inputs input by a plurality of users. At this time, for example, the processor 150 may include a plurality of control input sensing units 120, and may sense the control input based on a region of the display unit 110. In other words, the processor 150 may use the control input based on region information and control input sensing information. As a result, the display device 100 may detect the control inputs for a plurality of users. Also, for example, the control input may be a gesture input, and may include contact or non-contact based various inputs. Also, the control input may be the input which is input by an input device or an input which is input through voice or audio, and is not limited to the aforementioned embodiment.

Also, for example, the control input sensing unit 120 may be an element integrated with the display unit 110. For example, the display unit 110 may be a touch sensitive display unit 110.

The display device 100 may include the camera unit 130 optionally. In this case, the camera unit 130 may sense and capture an image. Also, for example, the display device 100 may detect the user by using the camera unit 130. Also, for example, the display device 100 may detect a location of eyes of the user by using the camera unit 130. In more detail, the display device 100 may detect the location of the display unit 110 where eyes of the user reach, by using the camera unit 130. At this time, the display device 100 may set the private region based on the location of eyes of the user. Also, the display device 100 may further detect the distance from the display device 100 to the user by using the camera unit 130. At this time, for example, the display device 100 may set a display method of the control object differently based on the distance from the display device 100 to the user, as described with reference to FIG. 9. Also, for example, the display device 100 may sense the arm length of the user by using the camera unit 130. In other words, the camera unit 130 may sense a gesture of the user and an operation range of the user. At this time, the display device 100 may set the private region based on the arm length of the user. At this time, for example, the camera unit 130 may include at least one of an infrared sensor, an ultrasonic sensor, a proximity sensor, and an illumination sensor. In other words, the camera unit 130 may include a sensor that may detect the distance to the user or the presence of the user, and is not limited to the aforementioned embodiment.

The display device 100 may further include the sensor unit 140 optionally.

At this time, the sensor unit 140 may be the unit included in the aforementioned camera unit 130. Also, for example, the display device 100 may detect the user by using the sensor unit 140. Also, for example, the display device 100 may detect the location of eyes of the user by using the sensor unit 140. Also, for example, the display device 100 may detect the distance from the display device 100 to the user by using the sensor unit 140. In other words, the display device 100 may include a separate unit separately from the camera unit 130 to detect the distance from the display device 100 to the user or the presence of the user. At this time, the sensor unit may include at least one of an infrared sensor, a proximity sensor, an ultrasonic sensor, and an illumination sensor. In other words, the sensor unit may be a sensor that senses the distance, and is not limited to the aforementioned embodiment. Also, as one example, the camera unit 110 and the sensor unit 140 may be configured as one integrated element, and are not limited to the aforementioned embodiment.

The processor 150 may be the unit that controls at least one of the display unit 110 and the control input sensing unit 120. Also, for example, the processor 150 may be the unit that further controls at least one of the camera unit 130 and the sensor unit 140. In more detail, the processor 150 may display the control object in at least one of the private region and the public region of the display unit 110. At this time, the processor 150 may detect the control input by using the control input sensing unit 120. The processor 150 may control the control object based on the detected control input. In more detail, the processor 150 may display the control object in the private region by using the display unit 110. At this time, the processor 150 may detect the control input by using the control input sensing unit 120. The processor 150 may move the control object from the private region to the first position of the public region based on the control input. At this time, the processor 150 may display a control indicator corresponding to the control object in the private region by using the display unit 110. At this time, the control object may be the indicator indicating that the control object exists in the public region. Also, the processor 150 may display the control object in the second position within the private region. At this time, the processor 150 may set the second position based on the first position. In other words, the processor 150 may set the position of the control indicator within the private region based on the position of the control object within the public region. As a result, the processor 150 may identify the position corresponding to the control object within the public region.

Also, the processor 150 may detect a moving direction and a moving speed of the control input by using the control input sensing unit 120. The processor 150 may control a moving distance of the control object by using the detected moving direction and moving speed. Also, the processor 150 may differently set a control method of the control object in the editing region included in the display unit 110 as described above.

Figure 11:
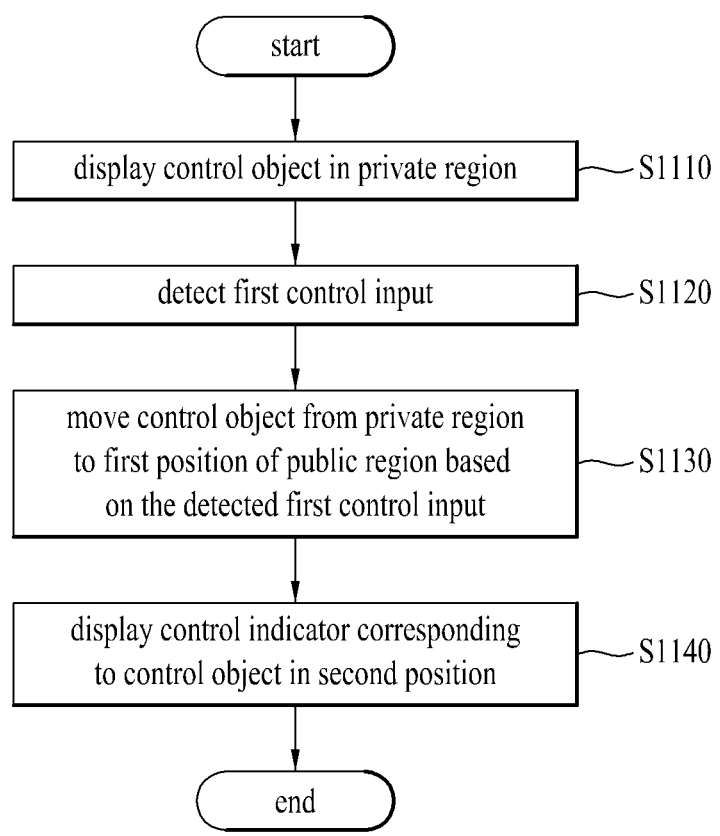
FIG. 11 is a diagram illustrating a method for controlling a display device in accordance with one embodiment of the present specification.

FIG. 11 is a diagram illustrating a method for controlling a display device in accordance with one embodiment of the present specification. The display device 100 may display the control object in the private region (S1110). At this time, as described with reference to FIG. 1, the control object may be the object controlled by the user who uses the display device 100. At this time, for example, the control object may be at least one of a user interface, an application, an icon, and a file. In more detail, the control object may be visual information controlled by the user of the display device 100 and displayed in the display unit 110 to implement an operation. At this time, for example, the control object may be located in the private region or the public region. At this time, for example, if the control object is located in the private region, the control object may be controlled by the user who is allowed to access the private region 210. Also, for example, if the control object is located in the public region, the control object may be controlled by all the users who use the display device 100. In other words, the control object may be controlled differently depending on a control method based on the position within the display unit 110.

Next, the display device 100 may detect a first control input (S1120). As described with reference to FIGS. 3a to 3c, the display device 100 may detect the first control input. At this time, the first control input may be the input moving in a first direction. Also, the first control input may be the input moved at a first moving speed. At this time, for example, the first control input may be at least one of a touch input and a gesture input. Also, the first direction may be the direction set based on a predetermined reference point within the private region. At this time, for example, the predetermined point may be the point of the display unit 110 where eyes of the user reach. Also, for example, the predetermined reference point may be set by the user or the processor 150, and is not limited to the aforementioned embodiment. Also, for example, the first direction may be determined based on a starting point of the first control input. In other words, the first direction may be the direction along which the first control input is moved.

Next, the display device 100 may move the control object from the private region to the first position of the public region based on the detected first control input (S1130). As described with reference to FIGS. 3a to 3c, the first position may be the point far away from the boundary between the private region 210 and the public region 220 equal to or less than the first distance. At this time, the boundary between the private region and the public region may be the point where the control object passes when moving from the private region to the public region. In other words, the first position may be set to the point far away from the boundary between the private region and the public region equal to or less than the first distance based on the moving path of the control object. Also, as described with reference to FIGS. 4a and 4b, if the moving speed of the first control input is increased, the display device 100 may increase the first distance. In other words, the display device 100 may move the control object such that the control object may be located farther away from the private region.

Next, the display device 100 may display a control indicator corresponding to the control object in the second position (S1140). As described with reference to FIGS. 3a to 3c, the display device 100 may display the control indicator in the second position of the private region. At this time, the control indicator may be the indicator indicating that the control object is located in the public region. Also, for example, the control indicator may be the indicator for controlling the control object.

The display device 100 may set the second position where the control indicator is displayed, based on the first position. In more detail, the second position may be set to the point far away from the boundary between the private region and the public region equal to or less than the second distance. At this time, the second position may be located in the private region. At this time, for example, the second distance may be set based on the first distance which is the distance from the boundary 360 between the private region and the public region to the first position. At this time, if the first distance is increased, the display device 100 may reduce the second distance. In other words, the display device 100 may display the control indicator to be close to the boundary between the private region and the public region if the control object becomes far away from the boundary between the private region and the public region.

Moreover, although the description may be made for each of the drawings for convenience of description, the embodiments of the respective drawings may be incorporated to achieve a new embodiment. Also, a computer readable recording medium where a program for implementing the embodiments is recorded may be designed in accordance with the need of the person skilled in the art within the scope of the present specification.

The display device and the method for controlling the same according to the present specification are not limited to the aforementioned embodiments, and all or some of the aforementioned embodiments may selectively be configured in combination so that various modifications may be made in the aforementioned embodiments.

In the meantime, the display device and the method for controlling the same according to the present specification may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

Also, although the preferred embodiments of the present specification have been described, it will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, both the product invention and the method invention have been described, and description of both inventions may be made complementally if necessary.

What is claimed is:

1. A display device comprising:
    a display unit configured to display visual information, wherein the display unit includes a private region and a public region;
    a control input sensing unit configured to detect a control input and to deliver the detected control input to a processor; and
    the processor configured to control the display unit and the control input sensing unit,
    wherein the processor is further configured to:
    display a control object in the private region,
    detect a first control input,
    move the control object from the private region to a first position of the public region based on the detected first control input, and
    display a control indicator corresponding to the control object in a second position of the private region,
    wherein the second position is determined based on the first position of the control object, and
    wherein the processor is further configured to, when the control indicator is displayed in the second position of the private region, detect a second control input and move the control object if the control indicator is moved by the detected second control input.

2. The display device according to claim 1, wherein the first position is determined based on at least one of a moving direction and a moving speed of the detected first control input.

3. The display device according to claim 2, wherein the first position is determined to a point far away from a boundary between the private region and the public region equal to or less than a first distance, and wherein the first distance is increased when the moving speed of the first control input is increased.

4. The display device according to claim 3, wherein when the second position is determined based on the first position, the processor is further configured to set the second position to a point far away from the boundary between the private region and public region equal to or less than a second distance, and
    wherein the second distance is set by the first distance.

5. The display device according to claim 4, wherein the processor is further configured to reduce the second distance when the first distance is increased.

6. The display device according to claim 4, wherein the first position and the second position are located in a first direction equally from a predetermined reference point within the private region.

7. The display device according to claim 1, wherein the processor is further configured to reduce the first distance when the second distance is increased as the control indicator is moved.

8. The display device according to claim 1, wherein the processor is further configured to:
    if the second position located in a first direction from a predetermined reference point is moved in a second direction from the predetermined reference point as the control indicator is moved, move the control object such that the first position is located in the second direction from the predetermined reference point.

9. The display device according to claim 1, wherein the control indicator indicates that the control object is located in the public region.

10. The display device according to claim 9, wherein the private region further includes an editing region, and
    wherein the processor is further configured to:
    set an editing mode if the second position is located within the editing region of the private region, and
    set an indicating mode if the second position is located outside the editing region of the private region.

11. The display device according to claim 10, wherein the editing mode is a mode that controls an object property of the control object by using the control indicator.

12. The display device according to claim 11, wherein the object property includes at least one of a size of the control object and a display direction of the control object.

13. The display device according to claim 12, wherein the indicating mode indicates that the control object is located in the public region, and does not control the object property of the control object.

14. The display device according to claim 1, wherein the control indicator controls the control object located in the public region.

15. The display device according to claim 14, wherein the processor is further configured to display a control interface controlling the control object, and
    wherein the control interface is adjacent to the control indicator in the private region.

16. The display device according to claim 1, further comprising a camera unit configured to detect a user,
    wherein the processor is further configured to set the private region based on the detected user.

17. The display device according to claim 16, wherein the camera unit is further configured to detect a location of eyes of the user, and
    wherein the processor is further configured to set a region within a first distance from the detected location of the eyes of the user in the display device as the private region, and set a region other than the private region within the display unit as the public region.

18. The display device according to claim 1, wherein the processor is further configured to:
   detect a second control input if the control object is located in the public region,
   display the control object by moving the control object from the public region to the private region based on the detected second control input, and
   terminate the display of the control indicator.

19. A method for controlling a display device, the method comprising:
   displaying a control object in a private region;
   detecting a first control input;
   moving the control object from the private region to a first position of a public region based on the detected first control input; and
   displaying a control indicator corresponding to the control object in a second position of the private region,
   wherein the second position is determined based on the first position of the control object, and
   wherein the control object is movable by moving the control indicator within the private region.

* * * * *